United States Patent [19]

Murota

[11] Patent Number: 5,174,077
[45] Date of Patent: Dec. 29, 1992

[54] FIRE PROTECTING STRUCTURE OF CHANNEL PORTION OF PLASTIC PIPING IN A FIRE PARTITION

[75] Inventor: George Murota, Tokyo, Japan

[73] Assignee: The Furukawa Electric Co., Ltd., Tokyo, Japan

[21] Appl. No.: 687,444

[22] Filed: Apr. 18, 1991

[30] Foreign Application Priority Data

Apr. 24, 1990 [JP] Japan ................. 2-43723[U]
Dec. 29, 1990 [JP] Japan ................. 2-406864[U]

[51] Int. Cl.⁵ ........................................ E04B 5/48
[52] U.S. Cl. ............................. 52/232; 52/221
[58] Field of Search ............. 52/232, 221; 126/314, 126/317

[56] References Cited

U.S. PATENT DOCUMENTS

| | | | |
|---|---|---|---|
| 2,053,555 | 9/1936 | Hall | 126/314 |
| 2,076,898 | 4/1937 | Labus et al. | 52/612 |
| 4,424,867 | 1/1984 | Mallow | 52/221 |
| 4,623,171 | 11/1986 | Wilson | 126/314 |
| 4,901,488 | 2/1990 | Murota et al. | 52/232 |

*Primary Examiner*—James L. Ridgill, Jr.
*Attorney, Agent, or Firm*—Frishauf, Holtz, Goodman & Woodward

[57] ABSTRACT

A fire protecting structure of a channel portion of a plastic piping in a fire partition wherein the plastic piping is inserted in a through hole formed in the fire partition and the through hole is filled with a refractory material, wherein a support means having a region, which makes a refractory material to come in contact with the outer surface of the plastic piping, and portions for supporting an intumescent material, the support means being arranged around the plastic piping and the refractory material being filled in the region of the support means to come in contact with the outer surface of the plastic piping.

12 Claims, 8 Drawing Sheets

FIRE PROTECTING STRUCTURE OF CHANNEL PORTION OF PLASTIC PIPING IN A FIRE PARTITION

BACKGROUND OF THE INVENTION

1. Field of the Invention

The present invention relates to a fire protecting structure of a channel portion wherein a long flexible pipe such as a cable insertion pipe passage and a plastic pipe for supplying and exhausting water is inserted into a fire partition such as a floor and a wall, and the like.

2. Description of the Related Art

In factories or buildings, in a case where a through hole is formed in a fire partition such a floor or a wall and a plastic piping such as a cable insertion pipe passage and a plastic pipe for supplying and exhausting water, and the like is inserted therein, there is required a fire protection, for example, refractory materials are filled in a space between the through hole and the plastic piping.

Figure 1A:
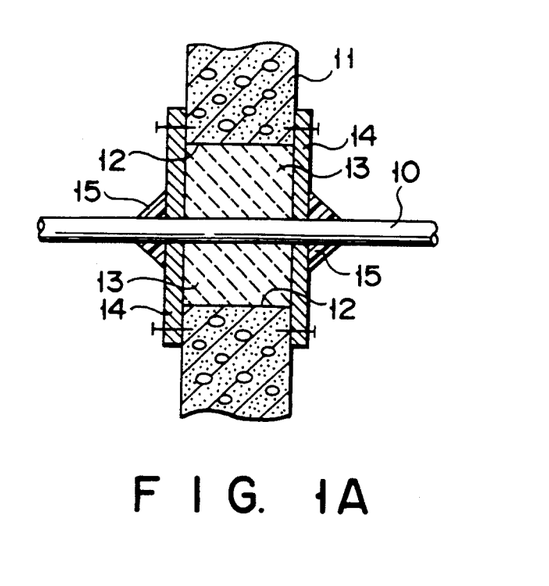
FIGS. 1A, 1B and 2 are schematic views explaining a conventional fire protecting structure of a channel portion of a plastic piping formed in a fire partition.
Figure 1B:
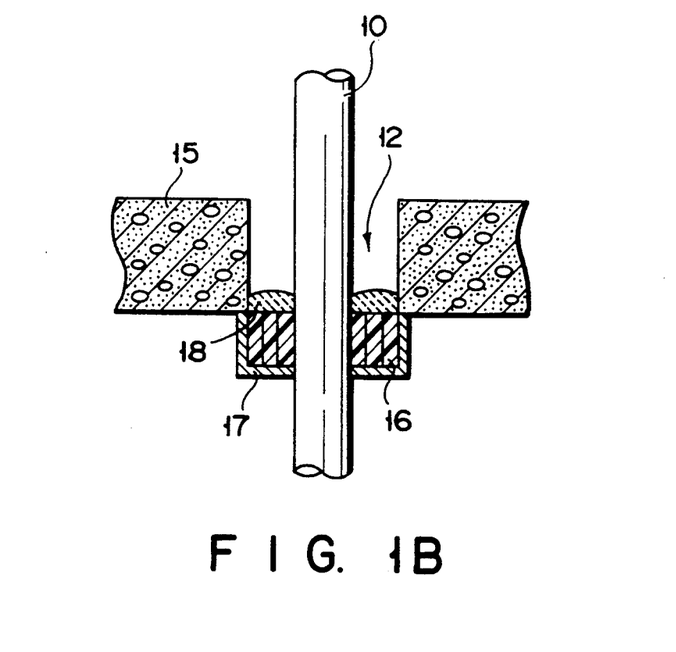

FIG. 1A shows a conventional typical fire protecting structure of a channel portion in the above-mentioned places. In the drawing, reference numeral 10 denotes a plastic piping such as a plastic pipe, and the like. The plastic piping 10 is inserted into a through hole 12 of a wall 11, which is a fire partition. Noncombustible fiber 13 such as rock wool is filled in a space between an outer periphery of the plastic piping 10 and an inner wall of the through hole 12. In both sides of the through hole, a refractory plate 14 formed of calcium silicate is arranged. The plastic piping 10 is fixed by a refractory seal member 15 and at the same time the channel portion is also sealed. FIG. 1B shows the fire partition in a case where the fire partition is a floor 15. In this case, a plastic piping 10 is inserted in the through hole 12 formed in the floor 15. The heat expandable refractory material 16 is wound on the plastic piping 10. The support 17 is attached to the bottom surface of the floor 15 so as to support the heat expandable refractory material 16. The putty is packed in the through hole 12. The above-structured fire protecting structure of the channel portion has been highly evaluated since it exhibits fire-resistance for about two hours. Moreover, the above-structured fire protecting structure of the channel portion can be applied to the case in which the plastic piping 10 is a plastic flexible wire pipe 20 in which an electric wire and a cable 22 are inserted as shown in FIG. 2 or a plastic pipe for supplying and exhausting water.

However, the following problems are found in the fire protecting structure of the channel portion of the plastic piping as shown in FIG. 1A.

First of all, since the refractory plate 14 is fixed to the wall 11 or noncombustible fiber 13 is filled the through hole 12 of the wall 11, the construction working becomes very complicated and working efficiency is reduced. Moreover, there is a possibility that workers will suck in flying noncombustible fiber 13 during the filling of the noncombustible fiber 13 in the through hole 12. This is unfavorable in view of the working conditions.

Figure 2:
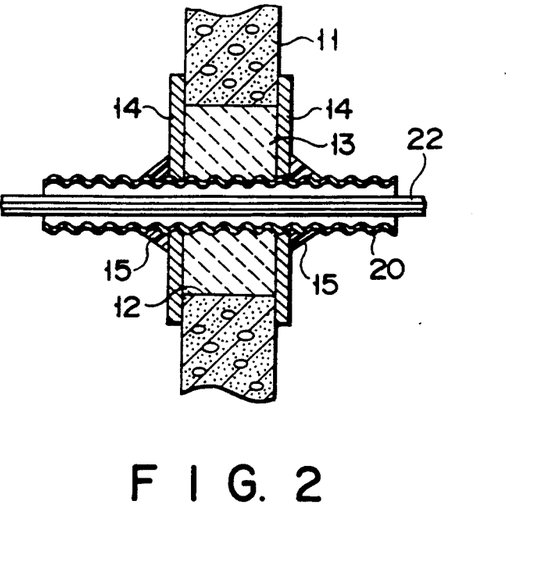
Figure 3:
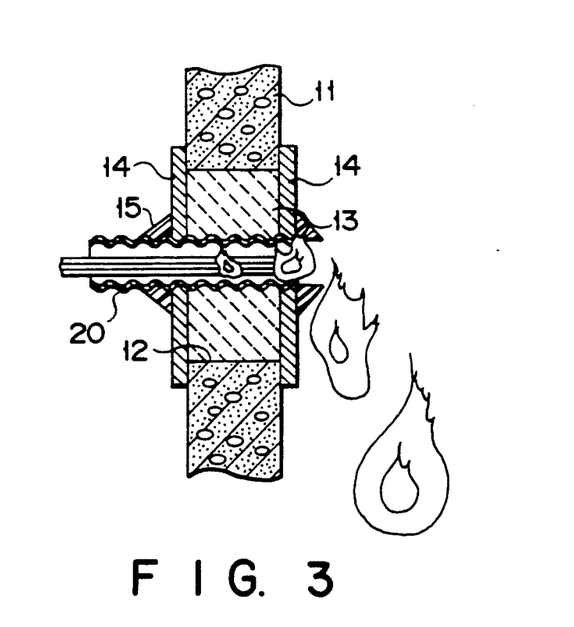
FIG. 3 is a schematic view showing a state when a fire breaks out in a conventional fire protecting structure of the channel portion.

Second, in a case where the plastic flexible wire pipe 20 as shown in FIG. 2 is used as plastic piping 10 to be inserted, the flexible wire pipe 20 having a large diameter is used in order to reserve a space for increasing electric wires. Due to this, the electric wire 22 is not closely provided in the interior portion. Particularly, at the beginning when a preliminary plastic flexible wire pipe is laid, there is provided no electric wire therein. Therefore, the interior portion becomes completely hollow. Regarding the plastic pipe for supply and exhausting water, the similar matter can be pointed out. Therefore, as shown in FIG. 3, if a fire breaks out, the spaces of these pipe and the hollow portions becomes fire passing ways, and no fire protection effect is exhibited. Moreover, polyethylene or polyvinyl chloride, which easily burns, is used for the coating materials of the inserted electric wires, the plastic flexible wire pipe or the plastic pipe for supplying and exhausting water. Due to this, the fire rapidly spreads through the plastic flexible wire pipe or the plastic pipe.

Moreover, in the conventional fire protecting structure of the channel portion of the plastic piping in the fire partition there is a possibility that the refractory plate 14 for sealing the through hole is liable to detach due to permeation of leakage of water or rainwater, or an earthquake or the shaking, and the performance of the fire protection will be lost.

SUMMARY OF THE INVENTION

An object of the present invention is to provide a fire protecting structure of a channel portion of a plastic piping in a fire partition wherein construction working is easy, a fire passing way is automatically closed when a fire breaks out, the spread of a fire through the plastic piping in the fire partition can be prevented.

The above object can be achieved by the fire protecting structure of a channel portion of a plastic piping in a fire partition wherein the plastic piping is inserted in a through hole formed in the fire partition and the through hole is filled with a refractory material, wherein a support means having a region, which makes a refractory material to come in contact with the outer surface of the plastic piping, and portions for supporting an intumescent material, the support means being arranged around the plastic piping and the intumescent material being filled in the region of the support means to come in contact with the outer surface of the plastic piping.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENT

Figure 4A:
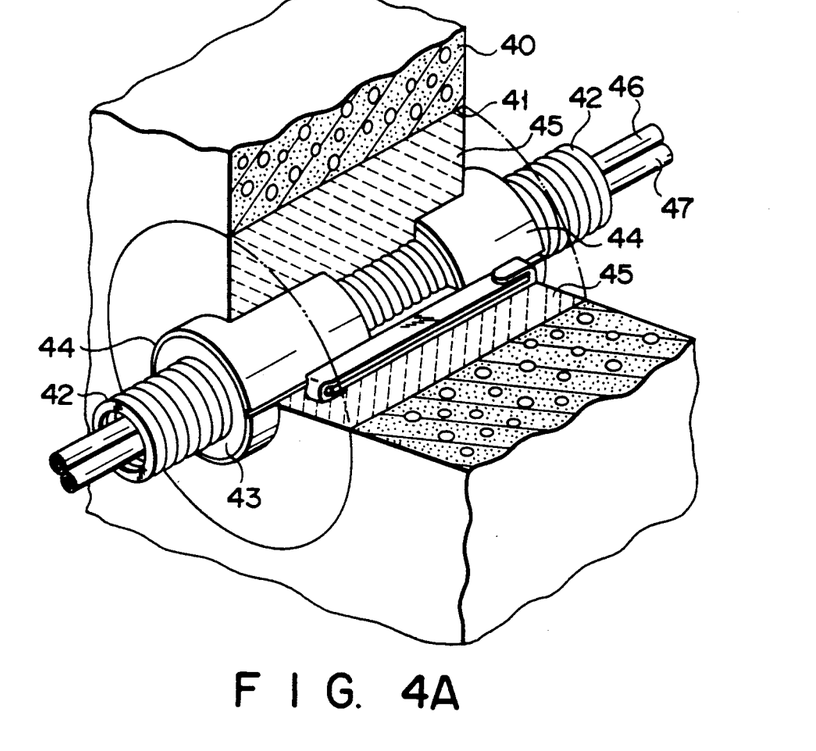
FIGS. 4A to 4C are a schematic view explaining one embodiment wherein a fire protecting structure of a channel portion of the present invention is applied to the fire protecting structure using a plastic pipe, which is inserted into a through hole formed in a fire partition.

FIG. 4A is a schematic view showing one example of the fire protecting structure of the channel portion of the plastic piping such as plastic flexible pipe in the fire partition of the present invention. In the drawing, reference numeral 40 is a wall, which is a fire partition. In the wall 40, there is found a through hole 41. In the through hole 41, a plastic pipe 42 is inserted. A pipe 46, 47 for supplying water, which is made of crosslinked polyethylene, is inserted inside the plastic pipe 42. In the outside of the plastic pipe 42, there is provided a support 44 whose structure has two cylindrical portion 51 for supporting an intumescent material and an opening portion 52 formed between two cylindrical portion 51. A refractory material 45 such as mortar is filled in the space between the support 44 and the inner wall of the through hole 41 of the wall 40.

In the through hole 41 of the wall 40, there is formed a space in order that the refractory material 45 is filled between the support 44 and the inner peripheral surface of the through hole 41.

Figure 4B:
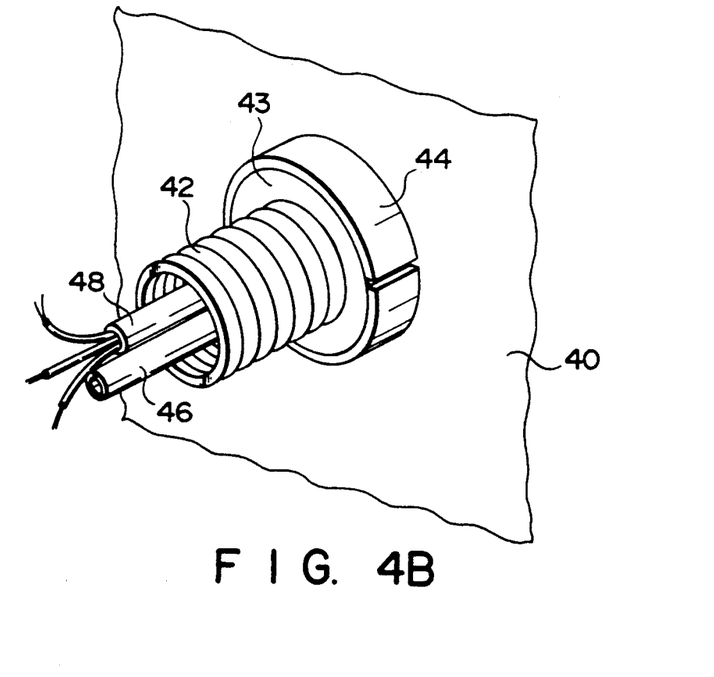
Figure 4C:
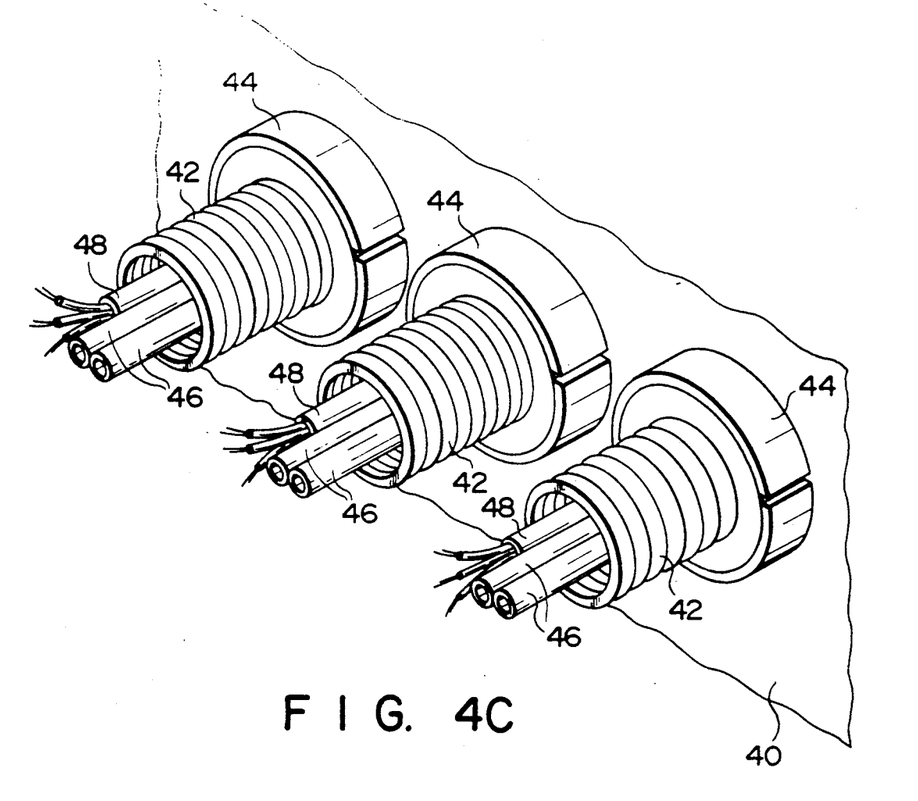

As shown in FIG. 4B, the plastic pipe 42 inserting an electric wire 48 and a pipe for supplying water may be used as the plastic piping. A plurality of this plastic pipe 42 may be arranged in the wall 40, as shown in FIG. 4C.

In the present invention, as a plastic piping, there can be used a plastic pipe for supplying and exhausting water, a plastic corrugated pipe, and a plastic corrugated wire pipe containing an electric wire in the inside of the plastic corrugated pipe.

Figure 5:
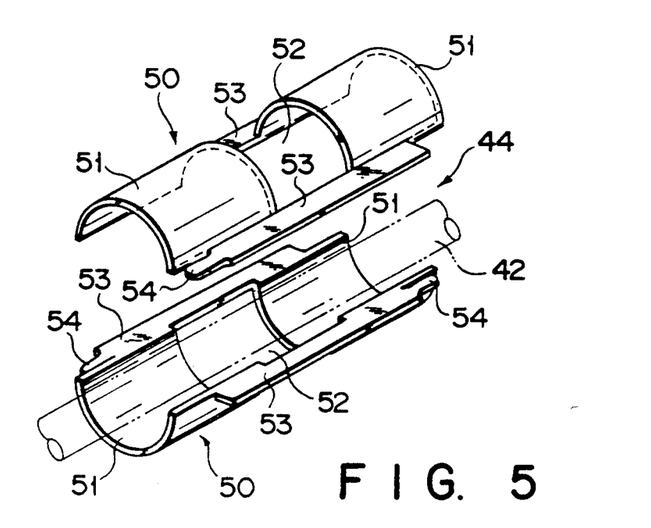
FIG. 5 is a schematic view explaining one example of a support, which is used in the fire protecting structure of the channel portion of FIG. 4.

As shown in FIG. 5, support 44 is formed by combining two half members 50 whose cross section are substantially semicircular. Each of the half members 50 comprises two semi-cylindrical portions 51, an opening 52, which is formed between the semi-cylindrical portions 51, blade portions 53, which is formed in both sides of the semi-cylindrical portions 51, and claw portions 54, which is formed to the opposite sides of the blade portion 53. The shape of the opening 52 is preferably formed in order to easily flow the refractory material 45 to be filled in the through hole 41.

Figure 6:
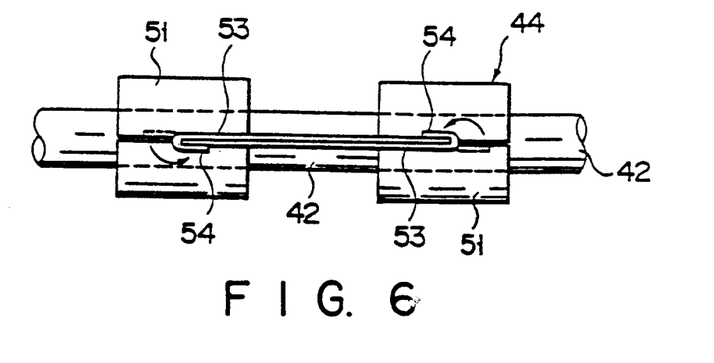
FIG. 6 is a schematic view explaining a state when the support of FIG. 5 is incorporated in the plastic piping.

As shown in FIG. 6, the support 44 is formed in the following manner.

Specifically, the half members 50 are combined to each other so that the semi-cylindrical portions 51 form a substantially cylindrical member. Then, the plastic pipe 42 is inserted into the cylindrical members, and the intumescent material is filled in the space between the plastic pipe 42 and the inner wall of the cylindrical members. Finally, the two half members 50 are integrated by bending claw portion 54 of the blade portion 53. The length of the support 44 is set to be thicker than the fire partition, that is, thickness of the wall 40 in order to cause to expand the supported intumescent material readily.

Figure 7A:
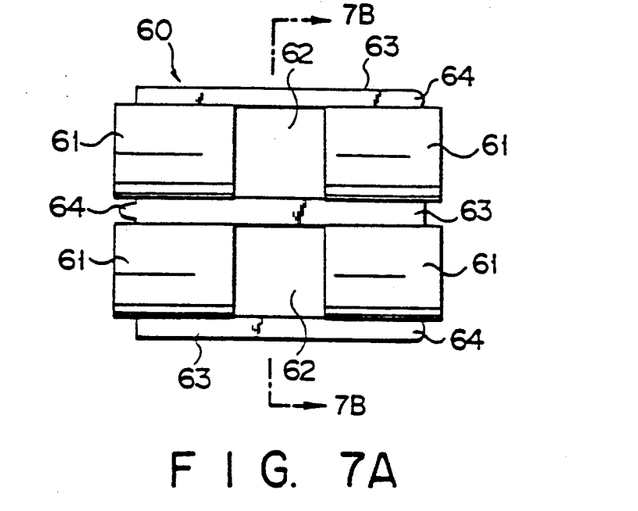
FIG. 7A is a schematic view explaining a multiple support which is other example of the support used in the fire protecting structure of the present invention.
Figure 7B:
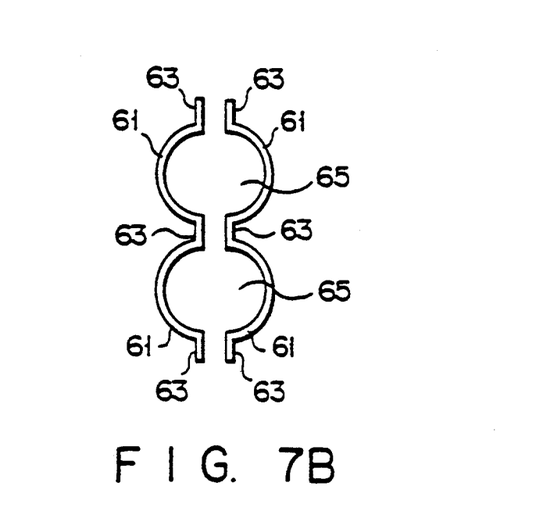
FIG. 7B is a cross sectional view taken along the lines of 7B—7B of FIG. 7A.

As shown in FIG. 7A, the support may be formed so that a predetermined number of half members 60 having semi-cylindrical portions 61, opening portions 62 which is formed between the semi-cylindrical portion, blade portions 63, and claw portions 64 are formed through blade portions 63 in series. By use of such a support, a region 65 in which two plastic piping is inserted can be reserved as shown in FIG. 7B.

As the intumescent material 43, any materials, which can be expanded by heating and exhibits good fire resistance when the material expands, may be used. For example, there can be used "DANSEAL F", "DANSEAL D" (trademark, available from Furukawa Electric Co. Ltd.), FOMOX (trademark, available from Bayer), and "FIREBARRIER" (trademark, available from 3M).

DANSEAL F is a foam containing inorganic filler, which expands to some extend, and have a small heat capacity and a high expanding ratio. Since this material has high thermal conductivity and largely expands, if the material is heated, the material rapidly expands to press the plastic piping 42 and the support 44 when the material is heated. Due to this, the space between the plastic piping and the electric wire inserted in the plastic piping is surely closed by the expanded material. Also, since DANSEAL F is an intumescent material, the intumescent material is soft and has good wettability with the plastic piping. Moreover, the material is converted to an ashing product after being formally expanded, thereby exhibiting good heat insulating effect.

Furthermore, DANSEAL D is a expandable clay composition, and has a high heat capacity, and a high density. DANSEAL D presses the plastic piping 42 and the support 44 strongly when the material is heated and closes the space between the plastic piping and the electric wire inserted in the plastic piping though the pressing speed is low. Moreover, similar to DANSEAL F, DANSEAL D is converted to an ashing product after being formally expanded, thereby exhibiting good heat insulating effect.

As refractory material 45, there can be used a mortar, a mixture of a vermiculite and a cement and the like. The refractory material 45 flows into the opening portion 52 of the support 44 and is filled therein in order to directly contact plastic pipe 42.

In a case where a fire breaks out in the fire protecting structure of the channel portion shown in FIG. 4, the refractory material 45, which is filled in the opening portion of the support 44, exhibits good fire-resistance in an initial stage, that is, before the intumescent material 43 expands. In other words, the combustion of the plastic pipe 42 is suppressed, and smoke and flame, which pass through the space between the plastic pipe 42 and the support 44, are interrupted. Due to this, there is caused shortage of oxygen in the vicinity of the plastic pipe 42 in the support 44, and the combustion is suppressed. Thereby, the spread of the combustion of the plastic pipe 42 can be delayed until the intumescent material 43 expands.

Figure 8:
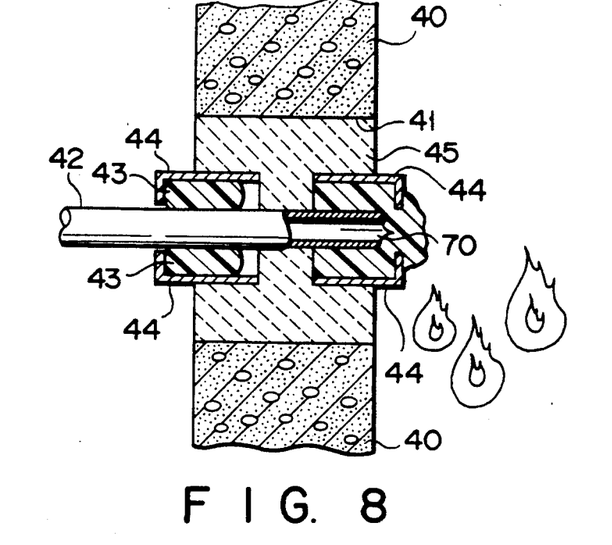
FIG. 8 is a schematic view showing a state when a fire breaks out in the fire protecting structure of the channel portion formed in a fire partition shown in FIG. 4.

When the fire becomes larger, the intumescent material 43 expands by the heat of the fire as shown in FIG. 8. At this time, since the intumescent material 43 is restricted by the inner periphery surface of the support 44, the outer periphery surface of the plastic pipe 42 is pressed, and the space between the inner periphery surface of the support 44 and the plastic pipe 42 is tightly closed. Thereby, the combustion is prevented from being spread through the plastic pipe 42. Then the intumescent material 43 is converted to an ashing product 70. Then, a good heat insulating effect is exhibited, and the transmission of heat is prevented. Therefore, the spread of the fire can be fully prevented by the above-mentioned fire protecting structure of the channel portion.

Figure 9:
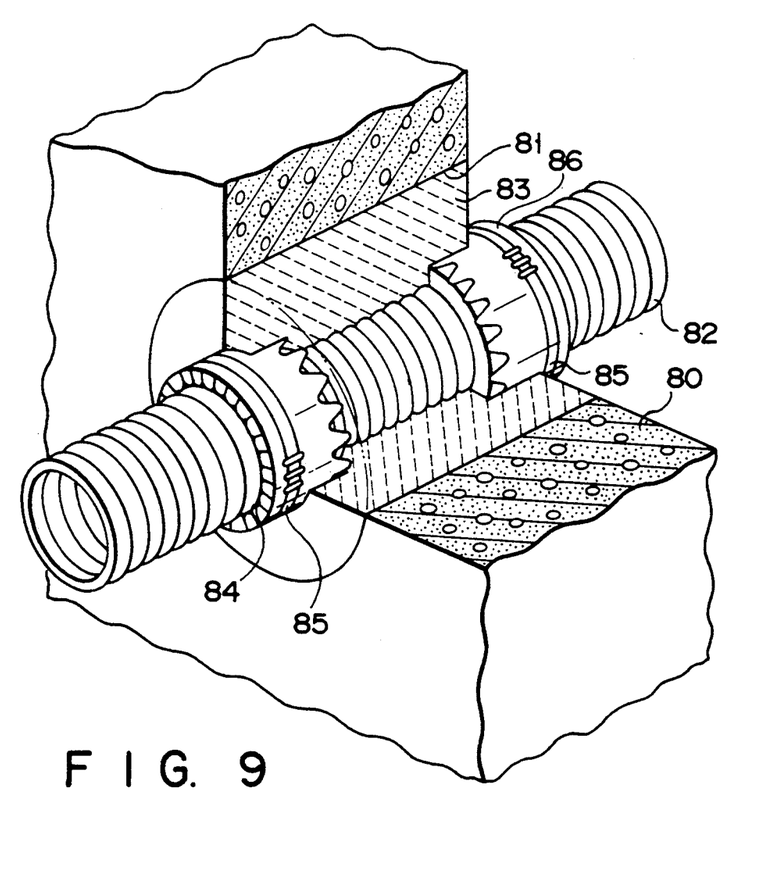
FIG. 9 is a schematic view explaining other embodiment wherein a fire protecting structure of a channel portion of the present invention is laid to a fire partition by using a plastic corrugated wire pipe, which is inserted into a through hole formed in a fire partition.
Figure 10:
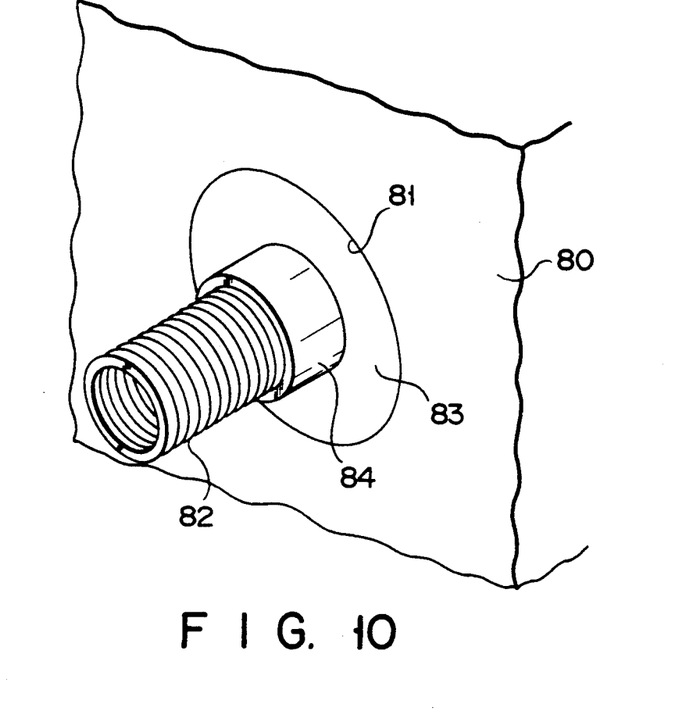
FIG. 10 is a schematic view showing a state when an intumescent material is coated in a projecting portion from the fire partition in which the corrugated wire pipe inserted in the fire protecting structure shown in FIG. 9.

FIG. 9 is a schematic view explaining other embodiment of the fire protecting structure of the present invention. In the drawing, reference numeral 80 denotes a wall, which is a fire partition. In the wall 80, there is formed a through hole 81. In the through hole 80, a plastic corrugated pipe 82 is inserted. In the corrugated pipe 82, an electric wire is inserted. In the space between the outer periphery surface of the corrugated pipe 82 and the inner periphery surface of a hole portion 81, there is filled with a refractory material 83. There is arranged a belt-like intumescent material 84 is wound around the corrugated pipe 82 extending from the wall 80 as shown in FIG. 10. A support 85 is attached to the outside of the intumescent material 84. Also, a pressing band 86, which is formed of a heat insulating material, is attached to the outer periphery surface of the support 85.

As a plastic corrugated pipe 82, there can be used a corrugated wire pipe, which is made of polyethylene such as PLAFLEKY and PLAFLEKY-CD (trademark, available from Furukawa Electric Co., Ltd.).

Figure 11:
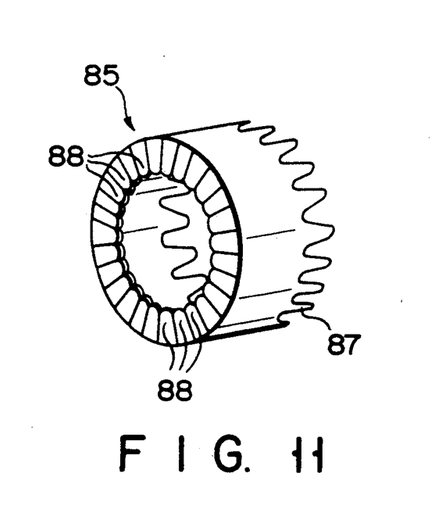
FIGS. 11 and 12 are a schematic view explaining other example of the support, which is used in the fire protecting structure of the channel portion shown in FIG. 9.

The support 85 supports the intumescent material similar to the support 44 shown in FIG. 5. As shown in FIG. 11, the support 85 has an inserting portion 87, which is formed of a plurality of projections, in its one end and a plurality of fixing claws 88, which project inside, in its other end. The inserting portion 87 is inserted into the refractory material 83, which is filled in the through hole 81, and the fixing claws 88 supports the corrugated pipe 82. The fixing claws 88 also serve to support the intumescent material 84, which is arranged in the space between the corrugated pipe 82 and the support 85, at the same time.

Figure 12:
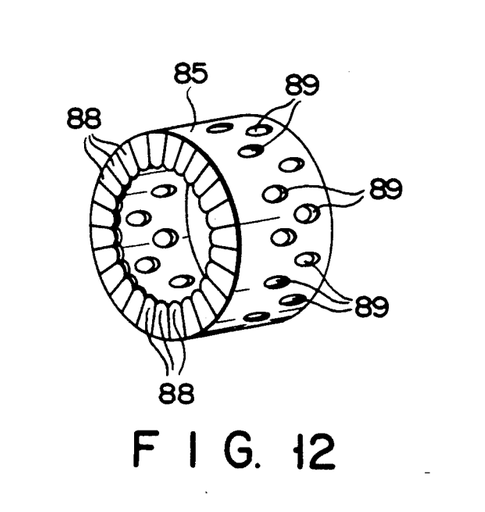

In a case where the support 85 is actually attached, the inserting section 87 is inserted to the refractory material 83 and the end surface of the belt-like intumescent material 84, which is wound around the extending portion of the corrugated wire pipe is pressed by the fixing claws 88. Moreover, regarding the attachment of the support 85, as shown in FIG. 12, preferably a plurality of through holes 89 are formed and the refractory material 83 enters from the through holes 89, thereby the support 85 may be firmly attached to the refractory material 83.

In a case where a fire breaks out in the fire protecting structure of the channel portion shown in FIG. 9, the refractory material 83, which is filled in the region between two supports 85, exhibits a good fire-resistance in an initial stage, that is, before the intumescent material 84 expands. In other words, the refractory material 83 prevents the combustion of the corrugated pipe 82 and interrupts smoke and flame passing through the space between the corrugated pipe 82 and the support 85. Due to this, there is caused shortage of oxygen in the vicinity of the corrugated pipe 82 in the support 85, and the combustion is suppressed. Thereby, the spread of the combustion of the corrugated pipe 82 can be delayed until the intumescent material 84 expands.

Figures 13, 14:
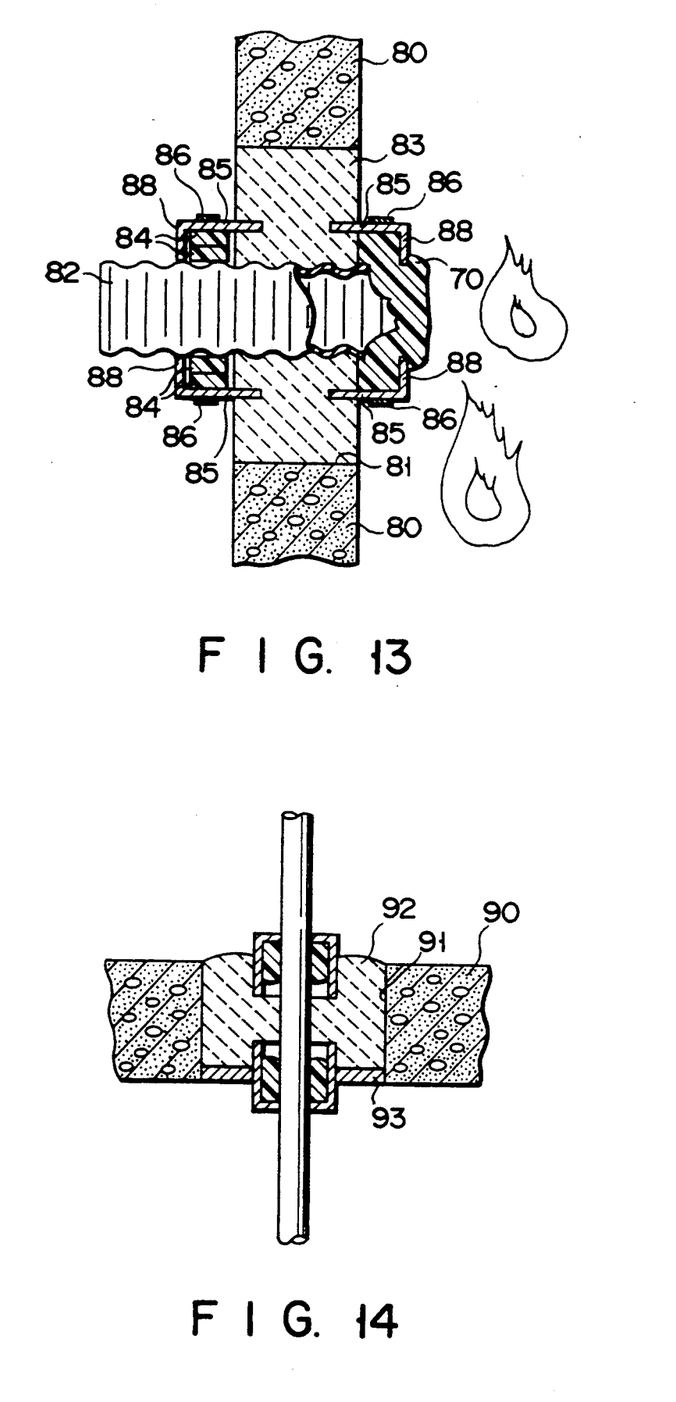
FIG. 13 is a schematic view showing a state of the fire protecting structure of the channel portion of the present invention which is applied to the corrugated wire tube shown in FIG. 9 when a fire breaks out.
FIG. 14 is a schematic view explaining a state of the fire protecting structure of present invention in a case where the fire partition is a floor.

If the fire becomes larger, the intumescent material 84 expands by the heat of the fire as shown in FIG. 13. At this time, since the intumescent material 84 is restricted by the support 85 and cannot expand outside, the corrugated pipe 82 is pressed. Thereby, the inner wall of the corrugated pipe 82 is closely fitted to the electric wire, which is inserted in the corrugated pipe 82, and the space of the inside of the corrugated pipe 82 is closed. Due to this, there is caused shortage of oxygen in the corrugated pipe 82 and the combustion is prevented from being spread through the corrugated pipe 82. If the intumescent which first expanded, is continued to be heated, the material is separated from the outer periphery surface of the corrugated pipe 82. However, the space between the inner periphery surface of the support 85 and the outer periphery surface of the corrugated pipe 82 is tightly closed as the intumescent material, which expands later, presses the outer periphery surface of the corrugated pipe 84 again. The expanded intumescent material 43 is finally converted to the ashing product 70. Then, a good heat insulating effect is exhibited, and the transmission of heat is prevented.

The above embodiment explained the case where the fire partition is the wall. The same effect can be obtained in a case where the fire partition is a floor. In this case, as shown in FIG. 14, a support 93 is preferably provided in advance not to leak the refractory material before a refractory material 92 is filled in a hole portion 91 of a floor 90.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A fire protection structure for a channel portion of a plastic piping that extends through a hole formed in a fire partition, comprising:

a refractory material filling a space between the plastic piping and an inner surface of the hole in the fire partition;

support means positioned around the plastic piping and including a support region for supporting said refractory material relative to the outer surface of the plastic piping and for causing said refractory material to contact an outer surface of the plastic piping;

intumescent material arranged between said support means and said plastic piping, said support means also including portions for supporting said intumescent material; and wherein the refractory material is provided at said support region of the support means so that the refractory material is caused to contact the outer surface of the plastic piping and fill the space between the plastic piping and the inner surface of the hole in the fire partition, whereby the support means positioned around the plastic piping with the intumescent material supported thereon, is fixedly attached to the fire partition by said refractory material, the intumescent material swelling when subjected to heat of a fire to reduce the size of an internal passage of the plastic piping.

2. The fire protecting structure according to claim 1, wherein said fire partition comprise a wall.

3. The fire protecting structure according to claim 1, wherein said refractory material comprises a mortar.

4. The fire protection structure according to claim 1, wherein said support means comprises:
a first and a second half member, each half member including:
two semi-circular portions;
an opening portion formed between said two semi-circular portions; and
blade portions having claw means for holding said semi-circular portions together; and
said semi-circular portions when held together by said blade portions forming a substantially cylindrical portion.

5. The fire protecting structure according to claim 1, wherein said fire partition comprises a floor.

6. The fire protecting structure according to claim 1, wherein said refractory material comprises a mixture of vermiculite and cement.

7. The fire protecting structure according to claim 1, wherein the intumescent material is provided between an inside portion of the support means and said outer surface of said plastic piping, said intumescent material swelling when subjected to heat to collapse said plastic piping to prevent a fire from passing through the fire protection structure through said plastic piping, said refractory material preventing the fire from passing through said fire structure along an outside portion of the support means.

8. The fire protecting structure according to claim 1, wherein the support means supports the intumescent material at first and second end portions thereof.

9. The fire protecting structure according to claim 1, wherein said plastic piping comprises a plastic flexible pipe having at least one of an electric wire, a cable, and a plastic pipe mounted therein.

10. The fire protecting structure according to claim 9, wherein said plastic pipe is a corrugated pipe.

11. The fire protecting structure according to claim 1, wherein said support means comprises:
a first and a second tubular member, each tubular member having an insertion portion including a plurality of projections formed on a first end thereof and having a plurality of fixing claws projecting from an inside surface of a second end thereof;
said support means being attached to said refractory material at the first end of the tubular member by inserting said inserting portion into said refractory material and said fixing claws supporting the plastic piping within the tubular member.

12. The fire protecting structure according to claim 11, wherein the support means comprises a plurality of holes, formed in a peripheral surface of said support means and through which said refractory material moves to fill said space between said plastic piping and said inner surface of the hole.

* * * * *